No. 783,964. PATENTED FEB. 28, 1905.
G. B. KEPLINGER.
PAPER CLIP.
APPLICATION FILED NOV. 7, 1904.
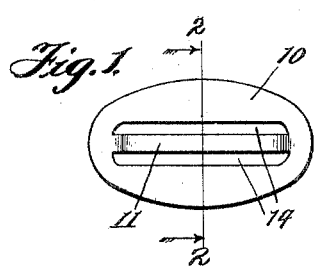
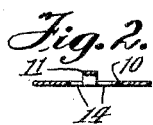
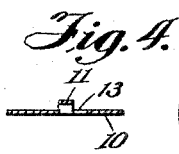
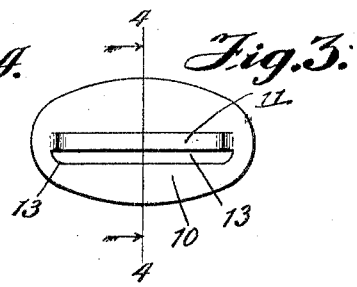
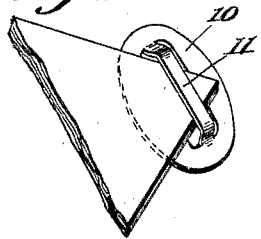
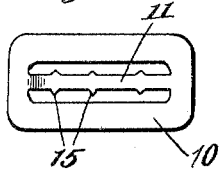
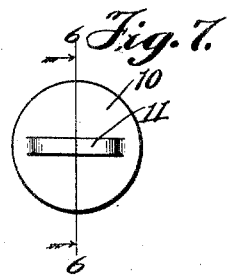
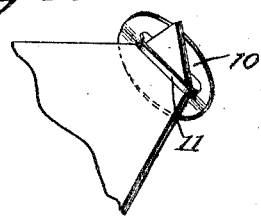
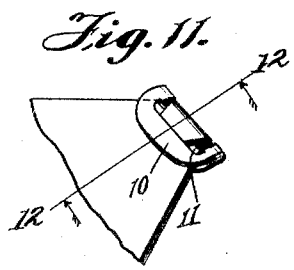
Witnesses:
Inventor:
George B. Keplinger
By Coburn & McRoberts
his Att'ys.

No. 783,964. Patented February 28, 1905.

UNITED STATES PATENT OFFICE.

GEORGE B. KEPLINGER, OF CHICAGO, ILLINOIS.

PAPER-CLIP.

SPECIFICATION forming part of Letters Patent No. 783,964, dated February 28, 1905.

Application filed November 7, 1904. Serial No. 231,672.

*To all whom it may concern:*

Be it known that I, GEORGE B. KEPLINGER, a citizen of the United States, residing at Chicago, in the county of Cook and State of Illinois, have invented certain new and useful Improvements in Paper-Clips, of which the following is a specification, reference being had therein to the accompanying drawings.

My invention relates to paper clips or fasteners, and has for its object to provide a novel device of this character which is inexpensive of manufacture, easily applied, and securely holds the papers from separation.

The invention consists of the device hereinafter particularly described, and pointed out in the appended claims.

In the drawings, Figure 1 is a plan view, on an enlarged scale, of a paper-clip made in accordance with my invention. Fig. 2 is a section on the line 2 2 of Fig. 1. Fig. 3 is a plan view of a modified form of clip. Fig. 4 is a section on the line 4 4 of Fig. 3. Fig. 5 is a side elevation of the clip. Fig. 6 is a section on the line 6 6 of Fig. 7. Fig. 7 illustrates a further modification of the invention. Fig. 8 illustrates another modification. Figs. 9 and 10 illustrate the manner of applying the clip. Fig. 11 is a perspective view showing the clip attached, and Fig. 12 is a section on the line 12 12 of Fig. 11.

The invention comprises generally a suitable plate 10, provided with a bar 11, stamped up from the plate 10 and between which and the plate the paper is inserted, so as to be firmly gripped and held when the plate is turned over or folded on itself.

The invention may be embodied in various forms, some of which are illustrated in the accompanying drawings.

The plate 10 may be of any suitable size and of any suitable shape—as, for example, in Figs. 1 and 3 the plate is shown as substantially oval in form, while in Fig. 8 it is rectangular and in Fig. 7 circular. Other forms may be employed, if desired, the shape of the plate not being material. The plate 10 is preferably made from a thin pliable sheet of metal capable of being readily bent or folded upon itself, and for this purpose thin sheets of brass, tin, or other suitable metal may be employed.

The bar 11 is stamped up from the plate 10 and of a suitable length, its ends being angularly disposed and connected to the plate and is spaced from the plate a proper distance to permit of the thickness of sheets to be fastened to be readily slipped between the bar and plate. As shown in Fig. 5, the bar 11 is parallel with the plate 10. In the clip shown in Fig. 7 the plate is slitted, as at 12, for a suitable distance, and the metal between the slits is then pressed or stamped outwardly to provide the bar 11. In the construction shown in Figs. 3 and 4 a portion of the plate at one side of the bar 11 is cut out, as at 13, while in the construction shown in Figs. 1, 2, and 8 the plate is cut away at both sides of the bar, as at 14. As shown in Fig. 8, one or both edges of the bar 11 may be serrated or provided with teeth 15.

In applying the clip the corners of the sheets to be fastened are slipped in between the plate 10 and the bar 11, as clearly shown in Fig. 9. The plate is then bent or folded over upon itself, preferably bending on the line of the slit or opening toward the center of the sheets, as shown in Fig. 10. The folded or upper side of the plate is then pressed firmly upon the sheets, so as to bring the two sides of the plate 10 as close together as possible, as shown in Fig. 11 and in section in Fig. 12. By reference to the latter figure it will be seen that the corners of the sheets are folded back upon the sheets between the bar 11 and the upper side of the folded plate, while the body of the sheets is located between the bar 11 and the under side of the plate, thereby securely holding the sheets together and preventing their separation from the clip and from each other. While the clips illustrated in Figs. 1, 7, and 8 may be readily folded in the manner described, by cutting out the plate at only one side of the bar, as shown in Fig. 3, the plate is insured of folding along the line of such cut-away portion by reason of the greater weakness of the plate at the ends of such cut-away portion. The serrated or toothed bar (shown in Fig. 8) is particularly useful for fastening together thick sheets, as the teeth when the clip is folded bite into the paper, and while this is not necessary, yet in some instances it may be desirable.

These clips may be used either as a permanent fastener, when a cheaper metal, such as tin, may be employed, or as a temporary fastener by making the clips of a more flexible metal, so as to permit their being folded and unfolded repeatedly without breaking.

Clips of this character are exceedingly inexpensive of manufacture and are applied without the use of tools. The sheets may be secured together and then detached from the clip without mutilating the sheets. As there are no protruding points or projections, there is no danger of the fingers being lacerated or pricked in attaching the clip, and also for this reason the clip may be used on paper sent through the mail without liability of injuring other papers or tearing the envelop.

Having described my invention, what I claim, and desire to secure by Letters Patent of the United States, is—

1. A paper-clip comprising a pliable metal plate having a bar cut therefrom and connected at its ends thereto.

2. A paper-clip comprising a pliable metal plate provided with a bar cut from the same and spaced therefrom.

3. A paper-clip comprising a pliable metal plate having a bar cut from and raised above the plate and connected only at its ends to the plate.

4. A paper-clip comprising a pliable metal plate provided with an elongated slot and having an integral bar parallel with the slot and spaced from the plate.

5. A paper-clip comprising a pliable metal plate provided with a pair of parallel elongated slots and having an integral bar stamped up from the metal between the slots.

6. A paper-clip comprising a pliable metal plate provided with a bar cut from the same and spaced therefrom and having teeth at its edges.

In testimony whereof I affix my signature in presence of two witnesses.

GEORGE B. KEPLINGER.

Witnesses:
ELIZABETH MOLITOR,
ARTHUR B. SEIBOLD.